United States Patent [19]

Lee

[11] 3,721,832
[45] March 20, 1973

[54] TIME DELAY AFTER DE-ENERGIZATION CIRCUIT

[75] Inventor: Art Lee, El Paso, Ill.

[73] Assignee: General Electric Company, New York, N.Y.

[22] Filed: March 29, 1972

[21] Appl. No.: 239,282

[52] U.S. Cl. ................... 307/141, 307/293, 307/304, 317/36 TD
[51] Int. Cl. ............................................. H03k 17/28
[58] Field of Search ............. 317/23, 22, 36 TD, 141; 307/141, 293, 304, 109; 320/1

[56] References Cited

UNITED STATES PATENTS

| | | | |
|---|---|---|---|
| 3,619,668 | 11/1971 | Pinckaers | 317/36 TD X |
| 3,633,050 | 1/1972 | Zajac | 307/293 |
| 3,641,397 | 2/1972 | Elliot et al. | 307/293 X |
| 3,662,220 | 5/1972 | Riebs | 317/36 TD |
| 3,287,608 | 11/1966 | Pokrant | 317/148.5 |
| 3,473,054 | 10/1969 | Wieczorek | 307/293 |

*Primary Examiner*—Robert K. Schaefer
*Assistant Examiner*—William J. Smith
*Attorney*—Arthur E. Fournier, Jr. et al.

[57] ABSTRACT

A timer circuit, adapted to provide a preselected time interval after loss of power to it to control reapplication of power to controlled means if the outage exceeds a predetermined interval, including a direct current power supply, resistor means connected across the power supply, a capacitor connected in circuit relationship with the power supply and resistor means whereby the rate of discharge of the capacitor is controlled by the resistor means, an enhancement mode field effect transistor connected in circuit relationship with the capacitor and a voltage level detector means such as to provide a linear output to the voltage level detector means corresponding to the charge existing on the capacitor, and wherein in accordance with one form of the invention the enhancement mode field effect transistor comprises a metal oxide semiconductor field effect transistor and the voltage level detector means comprises a Schmitt trigger circuit consisting of first and second transistors connected in circuit relationship with their associated resistors.

10 Claims, 1 Drawing Figure

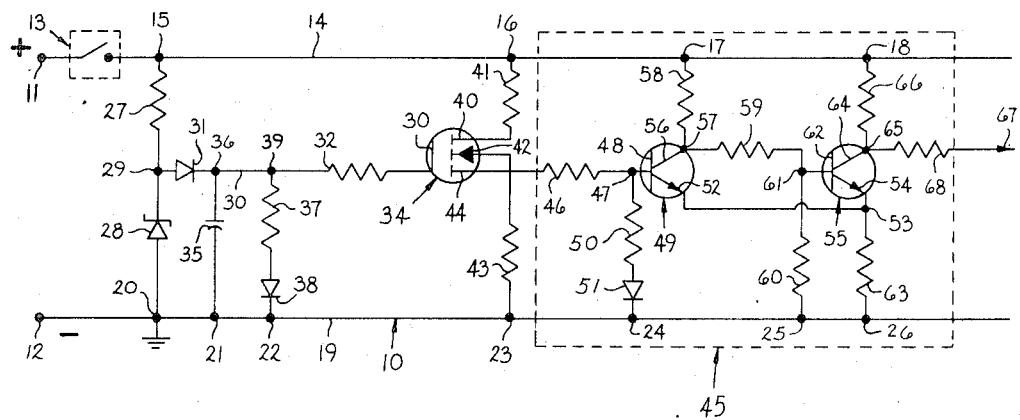

TIME DELAY AFTER DE-ENERGIZATION CIRCUIT

BACKGROUND OF THE INVENTION

1. Field Of The Invention

This invention relates to a timer circuit, and more particularly to a new and improved timer circuit for reacting in a timed manner to a power outage and for controlling the reapplication of power to controlled means if the outage exists for more than a predetermined interval of time.

2. Description Of The Prior Art

As is well-known in the prior art, time delay means have long been employed in circuits for purposes of performing a timing function. Moreover, there are in accordance with the prior art essentially two basically different types of conditions under which such time delay means are intended to operate. For example, time delay means have been employed in circuits wherein it is desired that the timing function be performed while the circuit is energized. On the other hand, other situations exist wherein there is a need to perform timing and control functions in response to de-energization of the circuit. It is with regard to the latter type of situation that the subject matter of the present patent application is particularly directed.

In this connection, of the various applications wherein electrical power is utilized to energize a load, there exists some in which damage may be done to the load, etc. if power is reapplied indiscriminately to the load after a loss of power, or power outage, condition has occurred. Thus for example, there is the situation wherein a pump being powered by electrical means suffers a loss of power. If the length of the power outage is such that the pump loses its prime, and if thereafter power is indiscriminately reapplied to the pump, the pump may be damaged as a result. Similarly in the case of large air conditioning units having a compressor powered by electrical means, the head pressure on the compressor may remain high during a power outage of short duration whereupon if power is thereafter indiscriminately permitted to be reapplied to the compressor, damage may occur thereto. In other applications wherein for example batches of ingredients are being mixed by the mixer powered by electrical means, the material being mixed may be ruined if the mixing operation is interrupted for more than a predetermined period of time such as as the result of a power outage. Thus in such instances it is important to know whether or not the interruption has extended beyond this predetermined critical interval of time. In addition, there are other applications wherein if a motor being powered by electrical means is caused to stop by virtue of the loss of power thereto, it is necessary that a restart cycle be initiated for starting the motor. Here also, if through the indiscriminate reapplication of power the restart cycle is not followed, damage may be done to the motor. There are many other such applications. Accordingly, the afore-referenced applications are not intended to be all-exclusive but rather are intended to merely exemplify some of the types of applications wherein a load, etc. may suffer damage if power is indiscriminately reapplied thereto after the occurrence of a power outage lasting beyond a predetermined time interval.

For such applications as those noted in the preceding paragraph, it has been commonplace to include some form of electrical timing means in the circuit to time the loss of power. However one difficulty with this is that the prior art timing devices, if electrically powered by the same source, also lose power during a power outage. For this reason, the prior art has heretofore provided an independent external energy source such as a battery to power the electrical timing means during a power outage to enable the latter to perform its function of timing the loss of power.

OBJECTS OF THE INVENTION

It is therefore an object of the present invention to provide a novel and improved timer circuit which is adapted to time a loss of power.

It is another object of the present invention to provide such a timer circuit which is capable of providing a predetermined timing function after loss of power to control reapplication of power if the power outage exceeds a predetermined interval.

A further object of the present invention is to provide such a timer circuit which is capable of providing a reliably repeatable time function after the occurrence of loss of power.

A further object of the present invention is to provide such a timer circuit which is not dependent on an independent external energy source for providing the timing function.

A still further object of the present invention is to provide such a timer circuit which is capable of providing a wide range of preselectively controllable alternatives for reapplying power following the occurrence of a power outage.

SUMMARY OF THE INVENTION

In carrying out the invention in one form, the timing circuit is connectable to a direct current power supply related to a power supply to be monitored and to be controlled following a power outage, and includes a resistor for connection across the power supply. A capacitor is connected in circuit relationship with the resistor such that the rate of discharge of the capacitor is determined by the resistor. A field effect transistor is connected in circuit relationship with the capacitor and a voltage level detector means corresponding to the charge existing on the capacitor.

When a loss of power occurs, the capacitor starts to lose its charge. The length of time in which it takes the capacitor to reach a predetermined discharge level is preselected. If power is restored to the circuit before this preselected length of time has elapsed, the capacitor still has sufficient voltage which continues to be applied to the voltage level detector means so that an output is provided therefrom to the circuit being controlled. In addition, upon power being restored the capacitor receives additional power thus returning it to its fully charged potential. If power is restored after the aforementioned preselected length of time has elapsed, the capacitor is incapable of providing sufficient voltage to the voltage level detector means to enable the latter to provide an output therefrom. However, with power restored under this condition, charging of the capacitor occurs at a controlled rate. When the capacitor reaches a predetermined charge level, the field effect transistor is conditioned whereby sufficient voltage is applied to the voltage level detector means such that the latter produces an output for transmission to the controlled circuit. The aforementioned preselected lengths of time can be varied to meet the requirements of different applications in which a timer circuit in accordance with the present invention may be employed.

The invention will be more fully understood from the following detailed description and its scope will be pointed out in the appended claims.

BRIEF DESCRIPTION OF THE DRAWING

The FIGURE is a schematic diagram of a timer circuit adapted to time loss of power and provide a control function in accordance with the present invention.

DESCRIPTION OF A PREFERRED EMBODIMENT

Referring now to the drawing, the invention as illustrated therein comprises a timer circuit, generally designated by reference numeral 10, which is particularly adapted for timing loss of power. Line power for the circuit 10 is applied across a pair of input terminals 11 and 12. This power is preferably taken from a direct current power source although it may also be provided from a rectified alternating current power supply. In the circuit 10, positive voltage is applied to input terminal 11 and negative, or zero, voltage is applied to input terminal 12.

In accordance with one embodiment of the invention, a switch, illustrated in the drawing enclosed within the dotted enclosure 13, is connected in series circuit relationship with input terminal 11 to provide a means for controlling the reapplication of power to the timer circuit 10 as will be described more fully hereinafter. Input terminal 11 is connected through switch 13 and by conductor lead 14 to junctions 15, 16, 17 and 18. Similarly, input terminal 12 is connected by conductor lead 19 to junctions 20, 21, 22, 23, 24, 25 and 26.

Series connected rate resistor 27 and Zener diode 28 are connected between junctions 15 and 20, and thereby across the pair of input terminals 11 and 12. The mid-point 29 of series connected rate resistor 27 and Zener diode 28 is connected by conductor lead 30 through decoupling diode 31 and resistor 32 to the gate 33 of field effect transistor 34. In accordance with the embodiment of the invention illustrated in the drawing, field effect transistor 34 comprises an enhancement mode field effect transistor and more particularly a metal oxide semiconductor field effect transistor (MOSFET). However, it is also contemplated within the scope of the present invention that other types of enhancement mode field effect transistors may be employed in the circuit 10 as well as field effect transistors of the junction type which normally function in a depletion mode but which are capable of being wired in the circuit 10 so as to function in an enhancement mode. Capacitor 35 which is connected between junctions 36 and 21 is charged to the voltage determined by the Zener diode 28 through rate resistor 27, and decoupling diode 31. The rate of charging of capacitor 35 is also controlled to a degree by resistor 37 and its associated diode 38 which are connected in series circuit between junctions 39 and 22.

With regard further to field effect transistor 34, the latter in addition to gate 33 also includes a drain 40 which is connected to conductor lead 14 through resistor 41 and junction 16, a second gate 42 which is connected to conductor lead 19 through resistor 43 and junction 22, and a source 44 which is connected to a voltage level detector means depicted in the drawing as enclosed within dotted enclosure 45. In accordance with the embodiment of the invention illustrated in the drawing voltage level detector means 45 comprises a controlled hysteresis network, commonly referred to as a Schmitt trigger. However, it is also contemplated within the scope of the present invention that the voltage level detector means 45 may take other forms. For example, such other forms (not shown) which the voltage level detector means 45 might take include an analog to digital converter system, an oscillator providing a pulse output, other circuits capable of providing either a voltage or a current shift, etc.

Referring now further to the embodiment of the invention shown in the drawing, source 44 of enhancement mode field effect transistor 34 is connected through resistor 46 and junction 47 to the base 48 of a first transistor 49. In addition, resistor 50 and temperature compensator diode 51 are connected in series between junctions 47 and 24. Resistors 46 and 50 and diode 51 comprise a voltage divider which determines the portion of voltage applied to base 48 of first transistor 49. The emitter 52 of first transistor 49 is connected through junction 53 to the emitter 54 of a second transistor 55 while the collector 56 of first transistor 49 is connected through junction 57, resistor 58, and junction 17 to conductor lead 14. Furthermore, the collector 56 of first transistor 49 is connected through junction 57 to a pair of series connected resistors 59 and 60, and therethrough to conductor lead 19. The mid-point 61 of series connected resistors 59 and 60 is connected to the base 62 of second transistor 55. The emitter 54 of second transistor 55, in addition to being tied to the emitter 52 of first transistor 49 as noted above, is also connected through junction 53, resistor 63 and junction 26 to conductor lead 19. The collector 64 of second transistor 55 is connected through junction 65, resistor 66, and junction 18 to conductor lead 14. The output 67 from voltage level detector means 45 is supplied from collector 64 of second transistor 55 through junction 65 and resistor 68 to the controlled circuit (not shown).

Considering next the mode of operation of timer circuit 10, power preferably from a direct current power supply is applied to input terminals 11 and 12 with positive voltage being applied to terminal 11 and negative or zero voltage to terminal 12. When power is initially applied, switch 13 is in a closed condition and capacitor 35 is charged through rate resistor 27 and decoupling diode 31 to the voltage determined by the Zener diode 28. In addition when power is initially applied the two transistors 49 and 55 are in a condition wherein first transistor 49 is OFF and second transistor is ON. There is thus no voltage at the output of second transistor 55 and accordingly no output is transmitted from voltage level detector means 45 to the controlled circuit.

Two functions are provided by timer circuit 10. One function is related to the time of charging of the capacitor 35. This is referred to as the "ON Time". The second function is related to the time to discharge the capacitor 35 to a certain level. This is referred to as the "OFF Time".

As the capacitor 35 charges, its voltage is amplified linearly by the field effect transistor 34. The base 48 of first transistor 49 receives a portion of this amplified voltage as determined by the voltage divider composed of resistors 46 and 50, and temperature compensator diode 51. When this voltage reaches a predetermined level, first transistor 49 turns ON and in turn causes second transistor 55 to turn OFF, thus providing an output 67 therefrom to the circuit to be controlled or to control means for controlling other means. First and second transistors 49 and 55 together with their associated resistors comprise a controlled hysteresis network, more commonly referred to in the art as a Schmitt trigger.

When power is removed from timer circuit 10, capacitor 35 starts to lose its charge. The rate of discharge is determined by the resistor 37 and its temperature compensating diode 38. Assume for purposes of example that a time of five seconds is the control consideration. If power is restored to timer circuit 10 before 5 seconds has elapsed, the capacitor 35 still has retained sufficient voltage to keep the output of field effect transistor 34 high enough to keep the base 48 of first transistor 49 driven to turn first transistor 49 ON and, in turn, second transistor 55 is OFF so that there is an output at the collector 64 of second transistor 55 through resistor 68 which is connectable to the circuit being controlled. Also, the capacitor 35 receives additional power, thus returning it to its fully charged potential.

If power is restored to timer circuit 10 after a period of 5 seconds, the voltage of the capacitor 35 is low enough to cause the output of field effect transistor 34 to be below that necessary to put first transistor 49 into conduction. Accordingly with first transistor 49 turned OFF, second transistor 55 is ON and no output is provided therefrom to the controlled circuit. The capacitor 35 then charges at a controlled rate and no output is available at the collector 64 of second transistor 55 until the various portions of timer circuit 10 reach their turn ON potentials as described above. Variations in "OFF Time" can be achieved such as by replacing resistor 37 with a differently valued resistor or with a potentiometer, and/or by varying the capacitance of capacitor 35. Similarly variations in "ON Time" can be obtained by using a potentiometer in place of rate resistor 27 and the trip point of timer circuit 10 can also be changed by substituting in the circuit 10 different valued resistors 50.

In addition other modifications can be made in timer circuit 10 in order to control the instant in time at which reapplication of power to the controlled circuit takes place after the occurrence of a loss of power if the length of the power outage exceeds a predetermined time interval. For example as illustrated in the drawing, timer circuit 10 can include a switch 13 which may or may not be caused to move to an open condition upon the occurrence of a power outage. If power is restored to timer circuit 10 with switch 13 open, capacitor 35 will not begin to charge until switch 13 is caused to move to a closed condition. Thus, the timing interval determined by the length of time it takes capacitor 35 to charge to the necessary level to cause field effect transistor 34 and first transistor 49 to reach their turn ON potentials will not begin until switch 13 is closed. As noted previously by changing the value of rate resistor 27 the timing interval can be varied. For example, if the value of resistor 27 is large, capacitor 35 will charge at a slow rate and a relatively long time interval will be provided. Conversely, if the value of resistor 27 is small, capacitor 35 will charge at a fast rate and a relatively short time interval will be provided. For some applications it may be desirable to eliminate the switch 13 such as to permit the automatic reapplication of an output or control signal to the controlled circuit. In such applications, the timing interval, i.e., the length of time after the occurrence of loss of power before an output is once again supplied from timer circuit 10 is determined by the rate resistor 27 which controls the rate at which capacitor 35 is charged, and therefore the time it takes capacitor 35 to reach the voltage level necessary to cause first transistor 49 to turn ON. Further, for those applications wherein it is desirable that if the power outage exceeds a predetermined period of time no output is supplied to the controlled circuit, a form of blocking circuit operable upon loss of power may be interposed between the output 67 supplied from the timer circuit 10 and the controlled circuit. Conventional forms of blocking circuits capable of being employed for this purpose are known to those skilled in the art, and accordingly will not be described herein inasmuch as they form no part of the present invention.

Thus in accordance with the present invention there has been provided a novel and improved timer circuit which is adapted to time a loss of power. Further in accord with the present invention such a timer circuit has been provided which is capable of providing a timing interval after loss of power to control reapplication of power if the outage exceeds a predetermined interval. Moreover the timer circuit of the present invention is capable of providing a repeatable time interval after the occurrence of loss of power. In addition in accordance with the present invention such a timer circuit has been provided which is not dependent upon an external energy source to provide the timing interval and can be operated from the source being monitored if desired. Finally it is to be noted from the foregoing that the timing circuit in accord with the instant invention is capable of providing a wide range of alternatives whereby the instant in time at which reapplication of power of the controlled circuit occurs can be varied.

While only one embodiment of my invention has been specifically illustrated in the drawing of the instant application a number of modifications thereof have been referred to hereinabove. For example, other forms of field effect transistors as well as other forms of voltage level detector means may be substituted for those illustrated in the drawing without departing from the essence of the invention. In addition, switch 13 may be omitted from timer circuit 10 if so desired. Thus, it will be appreciated that many other modifications of my invention may readily be made by those skilled in the art. I therefore intend by the appended claims to cover the above modifications as well as all other modifications which fall within the true spirit and scope of my invention.

What I claim as new and desire to secure by Letters Patent of the United States is:

1. A timer circuit comprising:
   a. a pair of input terminals connectable to a power supply for supplying direct current to the circuit;
   b. timer means including resistor means, a capacitor, a field effect transistor and voltage level detector means;
   c. said resistor means connected in circuit relationship with said pair of input terminals for connection across said power supply, said resistor means further connected in circuit relationship with said capacitor for controlling the rate of discharge of said capacitor;
   d. said field effect transistor connected in circuit relationship with said capacitor for amplifying linearly the voltage from said capacitor, said field effect transistor further connected in circuit relationship with said voltage level detector means for providing a linear voltage output to said voltage level detector means corresponding to the charge on said capacitor;
   e. said voltage level detector means having a first condition wherein an output is provided therefrom for transmission to a controlled circuit and a second condition wherein no output is provided therefrom; and
   f. said timer means providing a first timed interval during which upon the occurrence of a loss of power to the timer circuit with said voltage level detector means in said first condition said output from said voltage level detector means continues until the elapsed time of said loss of power exceeds said first timed interval.

2. A timer circuit as set forth in claim 1 wherein:
   a. said resistor means includes a resistor having a value preselected to cause said capacitor to discharge at a predetermined rate; and
   b. said first timed interval corresponds to the elapsed time for said capacitor to discharge to a predetermined level.

3. A timer circuit as set forth in claim 1 wherein:
   a. said field effect transistor comprises an enhancement mode metal oxide semiconductor field effect transistor; and
   b. said voltage level detector means comprises a controlled hysteresis network including first and second transistors and a plurality of resistors connected in circuit relationship such that when said first transistor is in an ON condition said second transistor is in an OFF condition and said voltage level detector means is in said first condition, and when said first transistor is in an OFF condition said second transistor is in an ON condition and said voltage level detector means is in said second condition.

4. A timer circuit as set forth in claim 1 wherein:
   a. said voltage level detector means is caused to move from said first condition to said second condition upon the occurrence of a loss of power to the timer circuit which exceeds the elapsed time of said first timed interval; and
   b. said timer means provides a second timed interval following which said voltage level detector means is caused to move from said second condition to said first condition to thereby once again cause said voltage level detector means to provide an output therefrom when power of said timer circuit is reinstated.

5. A timer circuit as set forth in claim 4 further comprising:
   a. switch means connected in circuit relationship with said pair of input terminals;
   b. said second timed interval corresponding to the elapsed time for said capacitor to recharge; and
   c. said second timed interval being initiated in response to operation of said switch means.

6. A timer circuit comprising:
   a. a pair of input terminals connectable to a power supply for supplying direct current to the circuit;
   b. time delay means including resistor means, a capacitor, an enhancement mode field effect transistor and voltage level detector means;
   c. said resistor means connected in circuit with said pair of input terminals for connection across said power supply, said resistor means further connected in circuit relationship with said capacitor for controlling the rate of discharge of said capacitor;
   d. said enhancement mode field effect transistor connected in circuit relationship with said capacitor for amplifying the voltage from said capacitor, said enhancement mode field effect transistor further connected in circuit relationship with said voltage level detector means for providing a voltage output to said voltage level detector means corresponding to the charge on said capacitor;
   e. said voltage level detector means having a first condition wherein an output is provided therefrom for transmission to a controlled circuit and a second condition wherein no output is provided therefrom;
   f. said time delay means providing a first timed interval during which upon the occurrence of a loss of power to the timer circuit with said voltage level detector means in said first condition said output from said voltage level detector means continues until the elapsed time of said loss of power exceeds said first timed interval; and
   g. said first timed interval corresponds to the elapsed time for said capacitor to discharge to a predetermined level.

7. A timer circuit as set forth in claim 6 wherein:
   a. said enhancement mode field effect transistor comprises a metal oxide semiconductor field effect transistor; and
   b. said voltage level detector means comprises a Schmitt trigger circuit.

8. A timer circuit as set forth in claim 6 wherein:
   a. said voltage level detector means is caused to move from said first condition to said second condition upon the occurrence of a loss of power to the timer circuit which exceeds the elapsed time of said first timed interval; and
   b. said time delay means provides a second timed interval following which said voltage level detector means is caused to move from said second condition to said first condition to thereby once again cause said voltage level detector means to provide an output therefrom.

9. A timer circuit for timing loss of power comprising:
   a. a pair of input terminals connectable to a power supply for supplying direct current to the circuit;

b. time delay means including resistor means, a capacitor, an enhancement mode field effect transistor and a controlled hysteresis network;

c. said resistor means connected in circuit with said pair of input terminals for connection across said power supply, said resistor means further connected in circuit relationship with said capacitor for controlling the rate of discharge of said capacitor;

d. said enhancement mode field effect transistor connected in circuit relationship with said capacitor for amplifying the voltage from said capacitor, said enhancement mode field effect transistor further connected in circuit relationship with said controlled hysteresis network for providing a voltage output to said controlled hysteresis network corresponding to the charge on said capacitor;

e. said controlled hysteresis network having a first condition wherein an output is provided therefrom for transmission to a controlled circuit and a second condition wherein no output is provided therefrom;

f. said controlled hysteresis network including first and second transistors and a plurality of resistors connected in circuit relationship such that when said first transistor is in an ON condition said second transistor is in an OFF condition and said controlled hysteresis network is in said first condition, and when said first transistor is in an OFF condition said second transistor is in an ON condition and said controlled hysteresis network is in said second condition;

g. said time delay means providing a first timed interval during which upon the occurrence of a loss of power to the timer circuit with said controlled hysteresis network in said first condition said output from said controlled hysteresis network continues until the elapsed time of said loss of power exceeds said first timed interval;

h. said first timed interval corresponding to the elapsed time for said capacitor to discharge to a predetermined level;

i. said controlled hysteresis network being caused to move from said first condition to said second condition upon the occurrence of a loss of power to the timer circuit which exceeds the elapsed time of said first timed interval;

j. said time delay means further providing a second timed interval following which said controlled hysteresis network is caused to move from said second condition to said first condition to thereby once again cause said controlled hysteresis network to provide an output therefrom; and k. said second timed interval corresponding to the elapsed time for said capacitor to recharge.

10. A timer circuit for timing loss of power as set forth in claim 9 further comprising:

a. switch means connected in circuit relationship with said pair of input terminals; and b. said second timed interval being initiated in response to operation of said switch means.

* * * * *